US012627447B1

(12) United States Patent
Wang

(10) Patent No.: US 12,627,447 B1
(45) Date of Patent: May 12, 2026

(54) NETWORK IMPROVEMENTS USING BEACON BURSTING COMMUNICATION TECHNIQUES

(71) Applicant: Amazon Technologies, Inc., Seattle, WA (US)

(72) Inventor: Jason Wang, Belmont, CA (US)

(73) Assignee: Amazon Technologies, Inc., Seattle, WA (US)

(*) Notice: Subject to any disclaimer, the term of this patent is extended or adjusted under 35 U.S.C. 154(b) by 599 days.

(21) Appl. No.: 18/081,505

(22) Filed: Dec. 14, 2022

(51) Int. Cl.
| | |
|---|---|
| *H04L 5/00* | (2006.01) |
| *H04W 72/0446* | (2023.01) |
| *H04W 72/12* | (2023.01) |
| *H04W 72/1268* | (2023.01) |

(52) U.S. Cl.
CPC ....... *H04L 5/0053* (2013.01); *H04W 72/0446* (2013.01); *H04W 72/1268* (2013.01)

(58) Field of Classification Search
CPC ............ H04L 5/0053; H04W 72/0446; H04W 72/1268; H94W 72/12
See application file for complete search history.

(56) References Cited

U.S. PATENT DOCUMENTS

| | | | |
|---|---|---|---|
| 7,193,644 B2 | 3/2007 | Carter | |
| 8,139,098 B2 | 3/2012 | Carter | |
| 8,144,183 B2 | 3/2012 | Carter | |
| 8,154,581 B2 | 4/2012 | Carter | |
| 8,780,201 B1 | 7/2014 | Scalisi et al. | |
| 8,823,795 B1 | 9/2014 | Scalisi et al. | |
| 8,842,180 B1 | 9/2014 | Kasmir et al. | |
| 8,872,915 B1 | 10/2014 | Scalisi et al. | |
| 8,937,659 B1 | 1/2015 | Scalisi et al. | |
| 8,941,736 B1 | 1/2015 | Scalisi | |
| 8,947,530 B1 | 2/2015 | Scalisi | |
| 8,953,040 B1 | 2/2015 | Scalisi et al. | |
| 9,013,575 B2 | 4/2015 | Scalisi | |
| 9,049,352 B2 | 6/2015 | Scalisi et al. | |
| 9,053,622 B2 | 6/2015 | Scalisi | |
| 9,058,738 B1 | 6/2015 | Scalisi | |
| 9,060,103 B2 | 6/2015 | Scalisi | |
| 9,060,104 B2 | 6/2015 | Scalisi | |
| 9,065,987 B2 | 6/2015 | Kasmir et al. | |
| 9,094,584 B2 | 7/2015 | Scalisi et al. | |

(Continued)

OTHER PUBLICATIONS

3GPP TSG-RAN WG4 Meeting#82, R4-1700989 Title:Introduce LBT model for multi LAA Scell(s) in LAA demodulation. (Year: 2017).*

*Primary Examiner* — Faruk Hamza
*Assistant Examiner* — Abusayeed M Haque
(74) *Attorney, Agent, or Firm* — Eversheds Sutherland (US) LLP

(57) ABSTRACT

This disclosure describes techniques for providing communications between an access point and one or more stations. Such techniques may involve determining, by the access point, transmission data to be provided to a station in an uplink transmission, determining a transmission time to perform the uplink transmission over a wireless channel, determining a point in time at which to reserve the wireless channel, the point in time being an amount of time before the transmission time, generating a series of beacons, individual beacons of the series of beacons comprising the uplink transmission of the wireless channel, and initiating transmission of the series of beacons at the point in time.

29 Claims, 7 Drawing Sheets

700

DETERMINE FIRST TIME BASED ON INTERVAL OF TIME 702

DETERMINE WHETHER WIRELESS CHANNEL IS OCCUPIED 704

TRANSMIT FIRST FRAME INDICATING FIRST AMOUNT OF TIME 706

TRANSMIT SECOND FRAME LESS THAN THE FIRST AMOUNT OF TIME AFTER FIRST FRAME 708

TRANSMIT THIRD FRAME LESS THAN THE FIRST AMOUNT OF TIME AFTER FIRST FRAME 710

(56)　　　　　References Cited

U.S. PATENT DOCUMENTS

| | | | |
|---|---|---|---|
| 9,113,051 B1 | 8/2015 | Scalisi | |
| 9,113,052 B1 | 8/2015 | Scalisi et al. | |
| 9,118,819 B1 | 8/2015 | Scalisi et al. | |
| 9,142,214 B2 | 9/2015 | Scalisi | |
| 9,160,987 B1 | 10/2015 | Kasmir et al. | |
| 9,165,444 B2 | 10/2015 | Scalisi | |
| 9,172,920 B1 | 10/2015 | Kasmir et al. | |
| 9,172,921 B1 | 10/2015 | Scalisi et al. | |
| 9,172,922 B1 | 10/2015 | Kasmir et al. | |
| 9,179,107 B1 | 11/2015 | Scalisi et al. | |
| 9,179,108 B1 | 11/2015 | Scalisi et al. | |
| 9,179,109 B1 | 11/2015 | Kasmir et al. | |
| 9,196,133 B2 | 11/2015 | Scalisi et al. | |
| 9,197,867 B1 | 11/2015 | Scalisi et al. | |
| 9,230,424 B1 | 1/2016 | Scalisi et al. | |
| 9,237,318 B2 | 1/2016 | Kasmir et al. | |
| 9,247,219 B2 | 1/2016 | Kasmir et al. | |
| 9,253,455 B1 | 2/2016 | Harrison et al. | |
| 9,342,936 B2 | 5/2016 | Scalisi | |
| 9,508,239 B1 | 11/2016 | Harrison et al. | |
| 9,736,284 B2 | 8/2017 | Scalisi et al. | |
| 9,743,049 B2 | 8/2017 | Scalisi et al. | |
| 9,769,435 B2 | 9/2017 | Scalisi et al. | |
| 9,786,133 B2 | 10/2017 | Harrison et al. | |
| 9,799,183 B2 | 10/2017 | Harrison et al. | |
| 2010/0272192 A1* | 10/2010 | Varadarajan | H04L 27/2613 |
| | | | 375/257 |
| 2018/0288684 A1* | 10/2018 | Ravuri | H04W 48/16 |

* cited by examiner

508

510

516

700

DETERMINE FIRST TIME BASED ON INTERVAL OF TIME 702

DETERMINE WHETHER WIRELESS CHANNEL IS OCCUPIED 704

TRANSMIT FIRST FRAME INDICATING FIRST AMOUNT OF TIME 706

TRANSMIT SECOND FRAME LESS THAN THE FIRST AMOUNT OF TIME AFTER FIRST FRAME 708

TRANSMIT THIRD FRAME LESS THAN THE FIRST AMOUNT OF TIME AFTER FIRST FRAME 710

NETWORK IMPROVEMENTS USING BEACON BURSTING COMMUNICATION TECHNIQUES

BACKGROUND

In a wireless local area network (WLAN) system, distributed coordination function (DCF) may be employed as a method enabling a plurality of stations (STAS) to share a wireless medium. DCF is based on a carrier sensing multiple access with collision avoidance (CSMA/CA). For example, Institute of Electrical and Electronics Engineers (IEEE) standards under the 802.11 umbrella, commonly referred to as WiFi, may utilize DCF based on CSMA/CA.

Generally, in operations under a DCF access environment, when a medium is not occupied (that is, idle) for a DCF interframe space (DIFS) interval or longer, a node may transmit a medium access control (MAC) protocol data unit (MPDU) to be urgently transmitted. When the medium is determined to be occupied according to a carrier sensing mechanism, a node may determine the size of a contention window (CW) using a random backoff algorithm and perform a backoff procedure. The node may select a random value in the CW to perform the backoff procedure and determine backoff time based on the selected random value.

When a plurality of nodes attempts to access a medium, a node having the shortest backoff time among the nodes will be the first to again try to access the medium and the other nodes may suspend the remaining backoff times and wait until the node having accessed the medium finishes transmission. When the node having accessed the medium finishes frame transmission, the other nodes contend again with the remaining backoff times to acquire a transmission resource.

In some networks, devices (e.g., stations (STAs)) in the network may reduce their energy consumption by regularly going into a sleep mode during which communication hardware is shut off. In such devices, time synchronization might be used, in which transmission of packets to the device is synchronized based on the time instances in which a radio for the device comes out of sleep mode (i.e., enters an awake interval). This enables the device to, for example, only turn on its radio for short durations to receive packets and to keep its radio off otherwise.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
FIG. 1 depicts an example environment in which a system may be implemented to use beacon bursting communication techniques in accordance with at least some embodiments.
Figure 1:
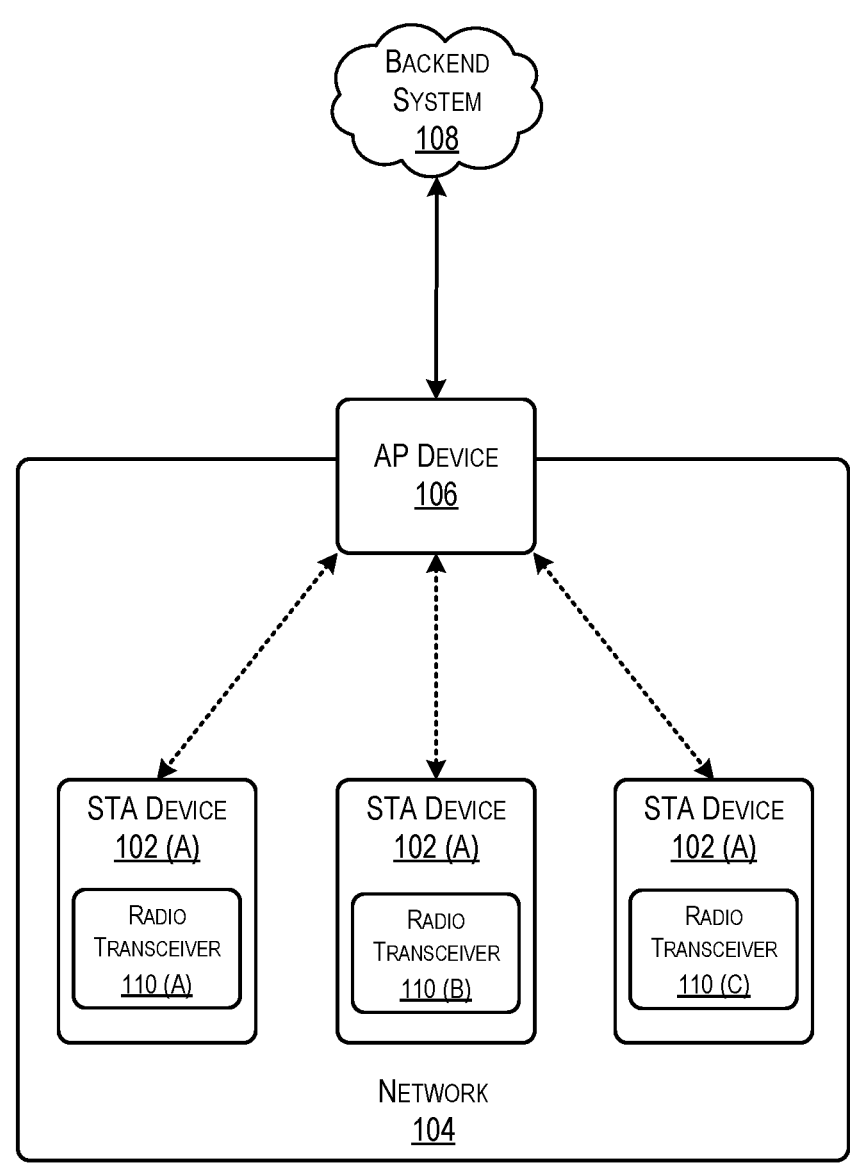

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

This disclosure describes, in part, techniques for enabling communications between an access point (AP) and a number of stations (STAs) while minimizing the impact of congestion or clock drift on such communications.

In an IEEE 802.11 compliant wireless local area network (WLAN), there are generally three types of frames: management frames, control frames, and data frames. Management frames are used to manage a basic service set (BSS), control frames control access to the medium (e.g., radio channel), and data frames contain payloads that convey information to a recipient.

One type of management frame is a beacon frame. A beacon frame serves to announce the presence of a wireless network broadcast by an AP, and synchronize members of the network.

A beacon frame includes a service set identifier (SSID) field that indicates an SSID of the wireless network corresponding to the beacon frame. A beacon frame may further include capability information, a frequency hopping parameter set, and a traffic indication map (TIM).

A beacon frame includes a timestamp field that indicates a time that the beacon frame was transmitted. This field is utilized by a station receiving the beacon frame to synchronize its clock to the AP's clock.

A beacon frame further includes a beacon interval field. The beacon interval field indicates a beacon interval defining how often a beacon frame is transmitted for the wireless network. For example, this may be 100 time units (TU), which might correspond to around 102.4 milliseconds.

During operation, a time synchronization mechanism may be used to time wake intervals during which a device is configured to receive information as well as to time the transmission of information to that device. This time synchronization mechanism may rely on local oscillator hardware that provides time reference for either the AP device and/or the STA device, even in sleep mode. These oscillators may have certain drift due to various factors such as aging, temperature variation, capacitor load imbalance, etc. This drift in the oscillators can result in mismatched timing between an AP and a STA.

For example, a client device representing a station may be configured to wake up to receive beacons for a wireless network it is connected to. The client device may determine a sleep or wake period based on the beacon interval defined in a beacon interval field of a received beacon frame for the wireless network. A client device may be configured to wake up for every beacon frame that is transmitted for a wireless network, or be configured to only wake up for a subset of transmitted beacon frames, e.g. for every third beacon frame. Clock drift at the client device may cause the client device's wake period to not be aligned with a transmitted beacon frame. This could be more common if a client device is configured not to wake for every transmitted beacon frame, as the more time that passes in between received beacon frames, the greater the clock differential caused by any clock drift.

Further, when an AP goes to initiate a beacon transmission, the AP needs to first contend for the channel. WiFi protocols commonly utilize something resembling a carrier sense multiple access/collision avoidance (CSMA/CA) approach where a node seeking to transmit first checks the channel to see whether the channel is clear and no other node is transmitting. If the channel is clear, the node will transmit. If, however, the channel is not clear (e.g. because another node is transmitting), then the node will generate a random or pseudorandom number to select a backoff period, and then, based on that generated random or pseudorandom number, wait a corresponding amount of time (e.g. a number of TUs or milliseconds) before again checking the channel to see if it is clear. A node that has begun waiting based on a selected backoff period may pause a timer if it is determined that the channel is again occupied, and only resume the timer once the channel is no longer occupied. Alternatively, a node may continue a timer irrespective of whether the channel is occupied.

In congested environments, contention requires more time, and the actual beacon transmission may be delayed, causing a client device waiting on a beacon frame to remain awake until the beacon frame is received. In an extreme scenario, an AP may repeatedly find a channel full and a beacon frame may be dropped entirely with transmission not occurring. Further, even if an AP is able to transmit, congested environments increase the probability of collision, where two nodes transmit simultaneously causing neither traffic to be recoverable. In this case, the client device would often remain awake for an entire beacon interval until the next beacon frame is received. Multiple beacon misses may cause the device to initiate a disassociation and reassociation, which translates to a loss of connectivity and potential impact on customer experience, e.g. an inability to access video on demand from a camera device or a device showing as offline.

In accordance with one or more preferred implementations, an AP may transmit multiple beacon frames back-to-back in a short burst, which may be characterized as beacon bursting, in order to increase the chance that a client device with clock drift will still receive a beacon frame (e.g. at least one of the beacon frames). Further, in accordance with one or more preferred implementations, an AP begins to contend a channel at a time prior to a time corresponding to a beacon interval, in order to maximize the chance of being able to transmit during the time corresponding to the beacon interval. In accordance with one or more preferred implementations, an AP transmits a beacon frame that includes an indication in a signal field of a preamble of a length of a transmission and/or an indication in a duration field of a payload of a duration of transmission.

In this regard, an 802.11a frame includes a signal field that indicates rate and length values, and other 802.11 frames include a legacy signal field that similarly indicates rate and length values. These rate and length values are used by nodes receiving the frame to determine how long the transmission will occupy the channel.

For 802.11a, a length value is generally determined as a number of bytes/octets sent in a media access control (MAC) protocol data unit (MPDU). In later 802.11 schemes, e.g. 802.11n/ac/ax, this value may be manipulated, e.g. because of the presence of extra preambles.

For example, the rate value may be set to 6 Mb/s, and the length value may be set to 1000 bytes. These may be used to calculate a duration that the channel will be occupied. This duration represents an amount of time from an end of a physical layer header that the channel will be occupied, e.g. an amount of time from the end of a legacy PHY preamble.

Additionally, a MAC layer header in a payload of an 802.11 frame contains a duration field that specifies a duration of the transmission. The value in this duration field is used by nodes receiving the frame to determine how long the transmission will occupy the channel. A receiving node sets a network allocation vector field based on such a duration field to facilitate determination of when the channel will no longer be occupied.

In accordance with one or more preferred implementations, an AP begins to contend a channel at a time prior to a time corresponding to a beacon interval, in order to maximize the chance of being able to transmit during the time corresponding to the beacon interval, and then transmits a frame (either a beacon frame or a dummy frame) that includes an indication in a signal field of a preamble of a length of a transmission and/or an indication in a duration field of a payload of a duration of transmission that the channel will be occupied for a length of time greater than a normal duration of a beacon frame, e.g. for a length of time corresponding to transmission of three or four beacon frames in a beacon burst.

In accordance with one or more preferred implementations, an access point determines a number of beacon frames to transmit based on a maximum transmit opportunity time. This facilitates collision avoidance, e.g. if the channel can only be occupied by a single transmission for the maximum transmit opportunity time, then guaranteeing at least one beacon frame transmitted outside of a period corresponding to the maximum transmit opportunity increases the chances that a collision will be avoided. For example, a number of beacons to transmit may be determined based on calculating a time such that, even if a transmission begins at the same time as a first transmitted beacon, the maximum transmit opportunity time would elapse prior to the last beacon beginning to be transmitted. Or even, a number of beacons to transmit may be determined based on calculating a time such that, even if a transmission begins prior to completion of transmission of a first transmitted beacon, the maximum transmit opportunity time would still elapse prior to the last beacon beginning to be transmitted.

In accordance with one or more preferred implementations, a first transmitted beacon frame includes an indication in a signal field of a preamble of a length of a transmission and/or an indication in a duration field of a payload of a duration of transmission that the channel will be occupied for a length of time greater than a normal duration of a beacon frame, e.g. for a length of time until a first time. Subsequently, a second transmitted beacon frame includes an indication in a signal field of a preamble of a length of a transmission and/or an indication in a duration field of a payload of a duration of transmission that the channel will be occupied for a length of time until the first time. Then, a third transmitted beacon frame includes an indication in a signal field of a preamble of a length of a transmission and/or an indication in a duration field of a payload of a duration of transmission that the channel will be occupied for a length of time until the first time.

Embodiments of the disclosure provide for a number of advantages over conventional systems. For example, embodiments of the disclosure allow for reservation of a radio channel, preventing contention of that radio channel during a transmission. Additionally, the embodiments of the disclosure allow for extension of the typical transmission time for an AP device. This minimizes potential issues that can occur due to clock drift. With the potential for such issues minimized, the length of a sleep interval can be increased, resulting in reduced power consumption of the STA device.

FIG. 1 depicts an example environment in which a system may be implemented to use beacon bursting communication techniques in accordance with at least some embodiments. An exemplary system as depicted with respect to environment 100 may include a number of station (STA) devices 102 (A-C) included in a network 104. The network 104 may further include at least one access point (AP) device 106 that enables communication with one or more electronic devices outside of the network 104, such as a backend system 108. It should be noted that the network 104 may include multiple AP devices.

A STA device 102 may be any electronic device configured to communicate with other devices on the network 104. In some cases, the STA device is a wireless sensor node equipped with one or more sensors, computing hardware, radio transceivers, and power components. The individual STA devices in the network (e.g., a wireless sensor network (WSN)) may be inherently resource-constrained, in that they may have limited processing speed, storage capacity, and communication bandwidth. The STA devices 102 may communicate among themselves or with the AP device 108 using radio signals.

Each of the STA devices 102 (A-C) may include at least a respective radio transceiver 110 (A-C). The radio transceiver 110 may be configured to both transmit and receive communications between the respective STA device 102 and another electronic device. The STA device may include medium access control (MAC) module or interface following the IEEE (Institute of Electrical and Electronics Engineers) 802.11 standards. A STA device may include a physical layer module or interface for radio media, and the term "STA" may, in its definition, include both an AP and a non-AP STA (station).

The network 104 may include any suitable local network of devices. In some embodiments, such a network 104 may include any combination of Personal Area Networks (PANs), Local Area Networks (LANs), Campus Area Networks (CANs), Metropolitan Area Networks (MANs), extranets, intranets, the Internet, short-range wireless communication networks (e.g., ZigBee, Bluetooth, etc.) Wide Area Networks (WANs)—both centralized and/or distributed—and/or any combination, permutation, and/or aggregation thereof. As noted above, the network 104 may include a wireless sensor network (WSN). In embodiments, the network 104 may be configured as a low-power (LP) version of a network type, such as a LPWAN. The devices in the network 104 might operate in either synchronous or asynchronous mode.

The AP device 106 may include any electronic device that provides an ingress/egress point for a network (e.g., network 104). In embodiments, the AP device 106 is a device that allows the management (control) of the network 104 and aggregates the information received from the STA devices 102 to send real-time, or near real-time, data to an AP device. The AP device 106 may act as a router for one or more STA devices 102. An example of an AP device 106 may include a router, routing switch, integrated access device, multiplexer, or any other suitable device. The AP device 106 may include one or more processors and a memory that stores computer executable instructions for implementing at least a portion of the functionality described herein.

In embodiments, the AP device 106 is configured to send and/or receive periodic transmissions to and/or from one or more of the STA devices 102. Each of the STA devices 102 may operate in a sleep mode for some predetermined amount of time (e.g., a sleep interval). In some cases, the amount of time that each STA device 102 spends in the sleep mode may be a default amount of time as set by a manufacturer or distributor of the STA device 102. In some embodiments, the amount of time that each STA device 102 spends in the sleep mode may be determined by the AP device 106. In these embodiments, the AP device 106 may provide instructions to each STA device 102 to set a sleep interval of the length of time as determined by the AP device 106. The AP device 106 may be configured to identify the sleep intervals associated with each of the STA devices 102 and may schedule periodic transmission times (e.g., transmit events) to occur during wake intervals (e.g., check events) for the STA devices 102.

In some cases, the transmissions performed by the AP device 106 may be performed as a series of beacon bursts. More particularly, rather than transmitting a beacon frame a single time, multiple beacon frames may be transmitted in a sequence with short interframe spacing or a predetermined spacing interval between each of the transmissions. The "burst" of beacon frame transmissions may be timed around a wake interval scheduled for a STA device in communication with the AP device.

The backend system 108 may be any suitable computing device or combination of computing devices configured to manage information collected via the STA devices 102 as described herein. In some embodiments, the backend system 108 is configured to provide instructions to one or more of the STA devices 102 via the AP device 106. In embodiments, the backend system 108 is configured to interact with a user device or other remotely located electronic device (e.g., via an application installed upon, and executed from, the user device).

In embodiments in which the AP device uses a Web server, the Web server can run any of a variety of server or mid-tier applications, including Hypertext Transfer Protocol ("HTTP") servers, FTP servers, Common Gateway Interface ("CGI") servers, data servers, Java servers and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase® and IBM®.

The various embodiments further can be implemented in a wide variety of operating environments, which in some cases can include one or more user computers, computing devices or processing devices which can be used to operate any of a number of applications. User or client devices can include any of a number of general-purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems and other devices capable of communicating via a network.

For clarity, a certain number of components are shown in FIG. 1. It is understood, however, that embodiments of the disclosure may include more than one of each component. In addition, some embodiments of the disclosure may include fewer than or greater than all of the components shown in FIG. 1. In addition, the components in FIG. 1 may communicate via any suitable communication medium (including the Internet), using any suitable communication protocol.

Figure 2:
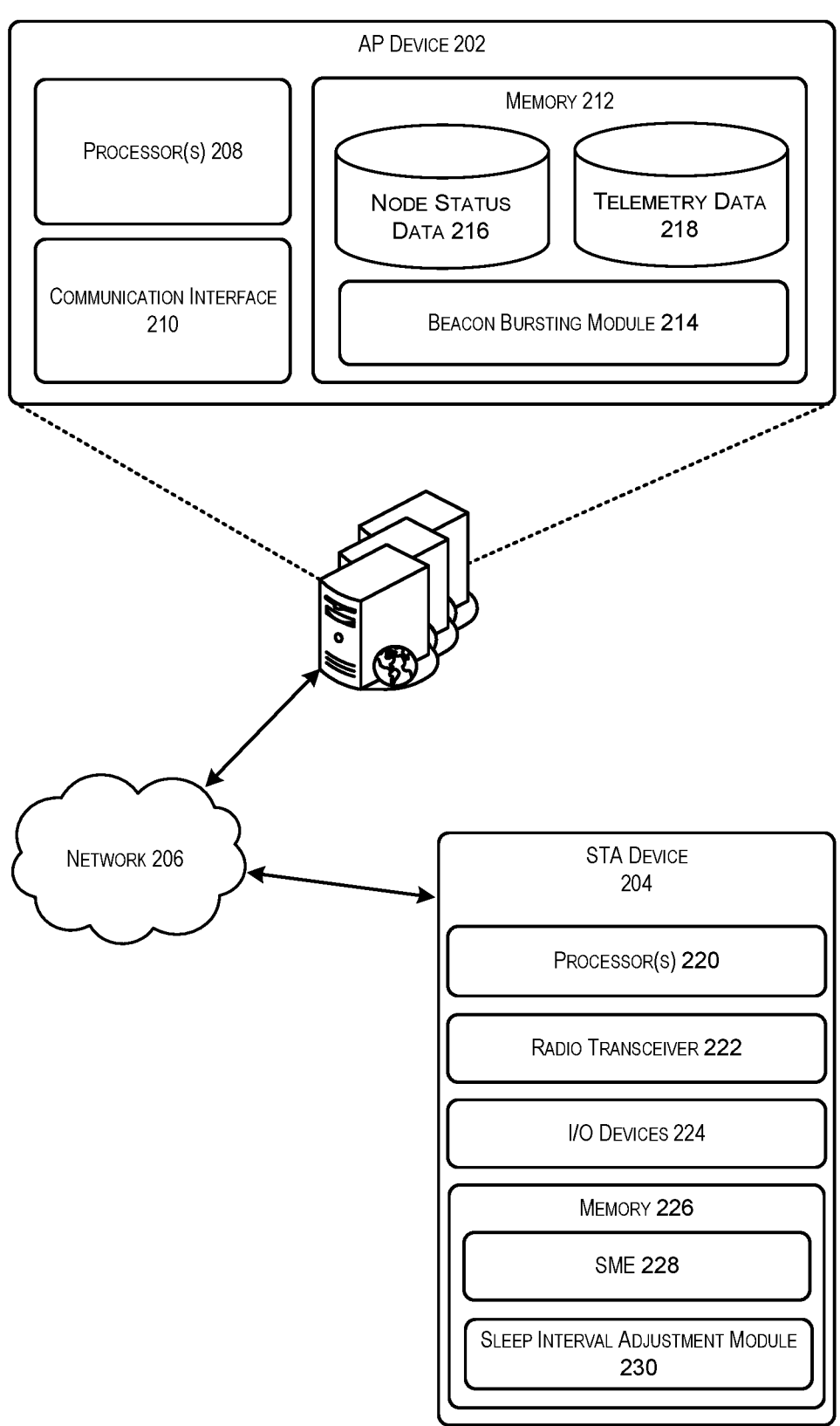
FIG. 2 depicts a system architecture that may be implemented to use communication techniques involving beacon bursting in accordance with at least some embodiments.

FIG. 2 depicts a system architecture that may be implemented to use communication techniques involving beacon bursting in accordance with at least some embodiments. As shown in FIG. 2, an AP device 202 may be in communication with at least one STA device 204 via a network 206. The AP device 202, STA device 204, and network 206 may be examples of the respective AP device 106, STA device 102, and network 104 as described in relation to FIG. 1 above.

As noted above, the AP device may include any computing device configured to manage communications between a backend system and the STA devices 102 using communication techniques as described herein. As depicted, the AP device 202 may include a number of hardware components, such as one or more processors 208, a communication interface 210, and a memory 212.

As used herein, a processor 208 may include multiple processors and/or a processor having multiple cores. Further, the processor(s) may comprise one or more cores of different types. For example, the processor(s) may include application processor units, graphic processing units, and so forth. In one instance, the processor(s) may comprise a microcontroller and/or a microprocessor. The processor(s) may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) may possess its own local memory, which also may store program components, program data, and/or one or more operating systems. The communication interface 210 may be any component configured to enable data to be communicated between electronic devices. The communication interface 210 may include one or more network interface controllers (NICs) or other types of transceiver devices to send and receive messages over network(s). For instance, the communication interface 210 may include a personal area network (PAN) component to enable messages over one or more short-range wireless message channels. For instance, the PAN component may enable messages compliant with at least one of the following standards IEEE 802.15.4 (ZigBee), IEEE 802.15.1 (Bluetooth), IEEE 802.11 (Wi-Fi), or any other PAN message protocol. Furthermore, the communication interface 210 may include a wide area network (WAN) component to enable message over a wide area network.

Memory 212 may include volatile and nonvolatile memory, removable and non-removable media implemented in any method or technology for storage of information, such as computer-readable instructions, data structures, program component, or other data. The memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information, and which can be accessed by a computing device. The memory may be implemented as computer-readable storage media ("CRSM"), which may be any available physical media accessible by the processor(s) to execute instructions stored on the memory. In one basic instance, CRSM may include random access memory ("RAM") and Flash memory. In other instances, CRSM may include, but is not limited to, read-only memory ("ROM"), electrically erasable programmable read-only memory ("EEPROM"), or any other tangible medium which can be used to store the desired information, and which can be accessed by the processor(s) 208.

Further, functional components may be stored in the memory, or the same functionality may alternatively be implemented in hardware, firmware, application specific integrated circuits, field programmable gate arrays, or as a system on a chip (SoC). In addition, while not illustrated, the memory may include at least one operating system (OS) component that is configured to manage hardware resource devices such as the communication interface 210, the I/O devices of the respective apparatuses, and so forth, and provide various services to applications or components executing on the processor(s) 208. Such OS component may implement a variant of the FreeBSD operating system as promulgated by the FreeBSD Project; other UNIX or UNIX-like variants; a variation of the Linux operating system as promulgated by Linus Torvalds; the FireOS operating system from Amazon.com Inc. of Seattle, Washington, USA; the Windows operating system from Microsoft Corporation of Redmond, Washington, USA; LynxOS as promulgated by Lynx Software Technologies, Inc. of San Jose, California; Operating System Embedded (ENEA OSE) as promulgated by ENEA AB of Sweden; and so forth.

Turning to the contents of the memory 212 in more detail, the memory 212 may include an operating system and one or more application programs or services for implementing the features disclosed herein including at least a module for implementing beacon bursting to facilitate communication with STA devices 204 (beacon bursting module 214). Additionally, the memory may also include node status data 216 that includes an indication of a current status for each of a number of STA devices as well as telemetry data 218 that includes information about the operation of at least one network (e.g., network 206) on which the STA devices are included.

In embodiments, the beacon bursting module 214 may be configured to, in conjunction with the processors 208, implement communication techniques that involve beacon bursting as described herein. In embodiments, such communication techniques may be used to reserve a wireless medium in order to negate or prevent issues caused by congestion and/or clock drift. The use of such communication techniques may result in the ability to implement longer sleep interval times than could otherwise be implemented without increased risk of missed transmissions due to clock drift. Hence, the use of such communication techniques allows for longer sleep intervals and therefor decreased battery consumption.

The beacon bursting module 214 may be configured to determine a number (e.g., quantity) of beacons (e.g., transmission events) to be used. In some cases, the number of beacons may be determined based on a type or urgency associated with data to be transmitted via the beacons. In some cases, the number of beacons may be determined based on an amount of transmission time that the beacon is intended to take.

The beacon bursting module 214 may further be configured to determine an amount of time before a scheduled transmission event a burst of beacons is to begin. In some cases, the beacon bursting module 214 may be configured to track the amount of time that is typically needed to initiate (e.g., successfully contend for a channel) or complete a transmission, or both. For example, an average contention time or an average transmission time may be calculated or updated based on determined data for contention or transmission. In embodiments, the amount of time before the scheduled transmission event a burst of beacons is to begin may be calculated based on the average contention or transmission time. In accordance with one or more preferred implementations, a rolling average contention time may be utilized, or even a rolling contention time value that is not simply an average, e.g. may be calculated weighting most recent data/values more heavily.

The beacon bursting module 214 may further be configured to determine an amount of time to insert between each of the beacons as a spacing interval/delay. This amount of time may be determined based on an estimated amount of time in microseconds required for a wireless interface to process a received frame and to respond with a response frame. In some cases, it is the difference in time between the first symbol of the response frame in the air and the last symbol of the received frame in the air.

The AP device may maintain information about statistics and/or characteristics associated with each of a number of types of STA devices (e.g., node status data 216). For example, information about particular STA devices may be provided by a manufacturer or seller of the STA device. Such information may include an indication of average or expected data values to be exhibited by such STA devices. For example, the information may include average maximum clock drift characteristics for the STA device, described in units of parts per million (PPM) that may be used to determine an accuracy of the clock included in a particular STA device. In such cases, the information may include an indication of an average PPM offset related to a crystal oscillator included in the STA device at room temperature. In some cases, an indication may be stored as to whether the device uses a TCXO compensation circuit to compensate for internal drift based on temperature variations.

In some cases, characteristic information may be provided by the STA device itself. For example, when the STA device 204 is provisioned onto the network 206, it may provide information about clock drift or other suitable characteristics. In another example, the STA device 204 may provide synchronization signals on a periodic basis. The timing of such synchronization signals may be compared against expected timing to determine an accuracy of the clock in the STA device.

The AP device may maintain information about a status of each STA device (e.g., node status data 216). In some cases, the information about the status of each STA device is updated as status information is received by the AP device from each of the STA devices. For example, one or more STA devices 204 may provide information about a current battery status. In this example, such information may include (but is not limited to) a state of charge (SOC), state of function (SOF), a state of health (SOF), and a variety of other values (e.g., temperature, etc.).

As noted above, the STA device 204 may be any electronic device configured to communicate with other devices on a network 206. As depicted, the STA device 204 may include a number of hardware components, such as one or more processors 220, a radio transceiver 222, one or more input/output devices 224, and a memory 226.

Similar to that of the AP device 202, a processor 220 may include multiple processors and/or a processor having multiple cores. Likewise, memory 226 may include volatile and nonvolatile memory, removable and non-removable media implemented in any method or technology for storage of information.

A radio transceiver 222 may include any suitable combination of transmitter and receiver circuitry. In some embodiments, the radio transceiver 222 may be included in a network interface card included within the STA device 204. In some cases, the radio transceiver may be external to the STA device 204, in that it may be separate from the STA device 204 but coupled to the STA device 204 via a physical connection.

An input device of the I/O devices 224 may be any component configured to enable a user to provide input to the STA device. Such an input device may include, but is not limited to, a button, a touch-sensitive surface, a switch, a slider, and/or any other type of device that allows a user to provide input to the STA device 204.

An output device of the I/O devices 224 may be any component capable of providing an output signal to a user. In some cases, an output device may comprise one or more lights that are powered up to provide an output signal to a user. In some cases, an output device may be a speaker capable of producing sound in response to an electrical signal input.

Turning to the contents of the memory 226 in more detail, the memory 226 may include an operating system and one or more application programs or services for implementing the features disclosed herein including a station management entity (SME) 228 configured to manage operations of the STA device 204, and at least a module for adjusting a length of a sleep interval to be implemented by the STA device 204 (e.g., sleep interval adjustment module 230).

The operation of a STA device in a WLAN system may be described in relation to a layer structure configured by the processor 220 in terms of a device configuration. The STA device 204 may include a plurality of layer structures. For example, the 802.11 standards relate to at least a MAC sublayer on a data link layer (DDL) and a physical (PHY) layer. The PHY may include a physical layer convergence procedure (PLCP) entity and a physical medium dependent (PMD) layer. The MAC sublayer and the PHY layer conceptually include management entities respectively called an MAC sublayer management entity (MLME) and a physical layer management entity (PLME). These entities provide a layer management service interface in which a layer management function works.

To provide an accurate MAC operation, a SME 228 may be present in each STA device 204. The SME 228 is a layer-independent entity that is present in a separate management plane or can be seen to be off to the side. Although accurate functions of the SME 228 are not illustrated in detail in this disclosure, the SME 228 may generally function to collect a layer-dependent state from various layer management entities (LMEs) and to similarly set the values of layer-specific parameters. Generally, the SME 228 may perform these functions on behalf of a general system management entity and may implement a standard management protocol.

In embodiments, the sleep interval adjustment module 230 may be configured to, in conjunction with the processors 220, adjust a length of a sleep interval as implemented on the STA device 204. In embodiments, the sleep interval adjustment module 230 may receive an indication of an amount of time from the AP device and may subsequently set the sleep interval to the indicated amount of time. In some embodiments, the sleep interval adjustment module 230 may be configured to automatically (e.g., without instruction from the AP device) adjust a length of the sleep interval based on characteristics of the STA device 204. For example, the sleep interval adjustment module 230 may set an amount of time for the sleep interval based on a current level of charge of a battery of the STA device 204.

Figure 3:
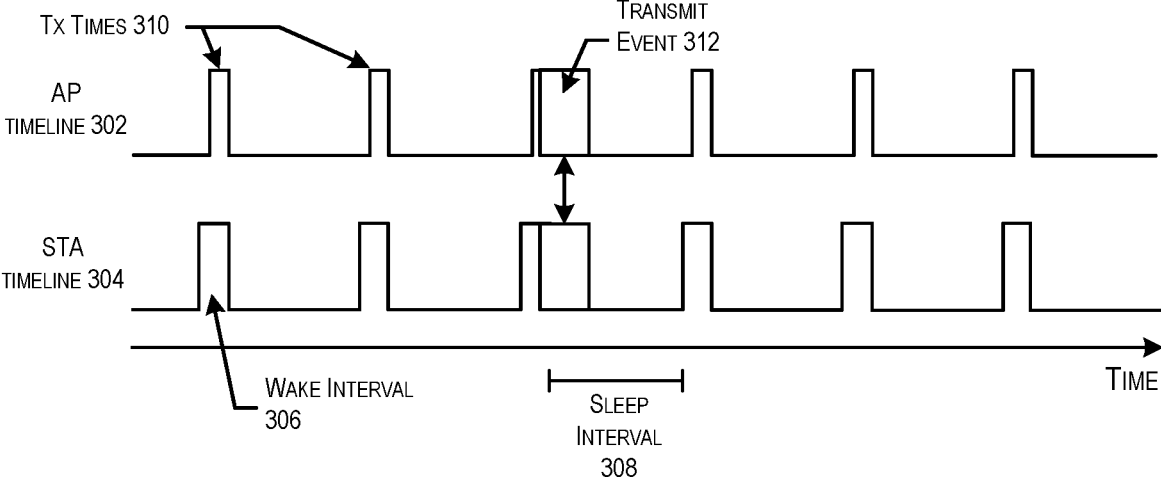
FIG. 3 is a conceptual view illustrating techniques for performing communication between an access point (AP) and a station (STA) in accordance with at least some embodiments.

FIG. 3 is a conceptual view illustrating techniques for performing communication between an access point (AP) and a station (STA) in accordance with at least some embodiments. Illustrated in FIG. 3 are an AP timeline 302 representing a first timeline associated with an AP device and a STA timeline 304 representing a second timeline associated with a STA device.

It should be noted that while FIG. 3 is focused on interactions between an AP device and a STA device, the illustration may refer to interactions between any suitable transmitter device and receiver device. However, which device is the transmitter device and which device is the receiver device is context specific. For example, a device that is the receiver device in one scenario may be a transmitter device in another scenario. By way of illustration, the example may represent communications between a first and second of two STA devices (e.g., STA devices 102 of FIG. 1) in embodiments of the system. In this illustration, the roles of the first and second STA devices may be reversed in a subsequent scenario, in that the transmitter device of the depicted example may be the receiver device in the subsequent scenario and vice versa.

As noted elsewhere, a STA device may be configured to operate using a sleep-wake cycle in which the radio circuitry is powered on during wake intervals 306 and powered off during sleep intervals (e.g., periods of time that are not wake intervals) 308. In some cases, wake intervals may occur during events in which the STA device is configured to communicate with, or at least check for communications with, the AP device.

The AP device may be configured to establish communication with one or more STA device during periodic transmission times 310. In some cases, upon receiving information from an AP device, the STA device may cause its internal timing mechanism to be updated to match that of the AP device (or vice versa). In some cases, the AP device (or the STA device) may communicate a synchronization signal that includes an indication of timing information (e.g., a predetermined amount of time and/or interval) for transmission times 310. In these cases, the STA device may be configured to adapt its own timing information to that indicated in the synchronization signal.

A wake interval 306 may be any event in which the STA device is configured to wake up (e.g., power on its radio) in order to receive any communications transmitted by the AP device. A wake interval 306 may be associated with a predetermined amount of time. In some cases, such a predetermined amount of time may be a default (or standard) amount of time. In other cases, such a predetermined amount of time may vary based on one or more configuration settings associated with the STA device and/or a type of the STA device. Additionally, a wake interval 306 may occur at predetermined intervals (e.g., every 15 seconds, etc.). Once more, the predetermined intervals at which the wake intervals occur may be default (or standard) intervals or the predetermined intervals may vary based on one or more configuration settings associated with the STA device and/or a type of the STA device. A wake interval 306 either ends if no communications are received in the predetermined amount of time or becomes a transmit event 312 if communication is established between the AP device and the STA device within the predetermined amount of time.

A transmit event 312 may be any event in which data is communicated between the AP device and the STA device. A transmit event 312 may begin during a scheduled transmission time 310. During the transmission time 310, the AP device broadcasts a frame to multiple STA devices. One or more of the multiple STA devices may then respond by sending a frame to the AP device. If multiple STA devices respond, then the STA devices contend for the channel. This may result in one of the STA devices reserving the channel and the other STA devices performing a backoff procedure until the channel is opened up.

As noted above, each wake interval 306 represents a period in a sleep/wake cycle during which a radio of the STA device is turned on. The wake interval 306 may be separated by intervals of time during which the radio of the STA device is turned off, referred to as sleep intervals 308. A length of the sleep interval 308 may vary by STA device. For example, the length of the sleep interval 308 may be longer or shorter depending on the type of the STA device. In another example, the length of the sleep interval 308 may be determined by an AP device in communication with the STA device. In some cases, a length of the sleep interval may be determined based on characteristics of the STA device. For example, a length of the sleep interval 308 may be determined based on an amount of charge (e.g., state of charge (SOC)) left in a battery of the STA device. In this example, a STA device having a lower amount of battery charge may have a sleep interval that is longer than a STA device having a higher amount of battery charge.

Figure 4:
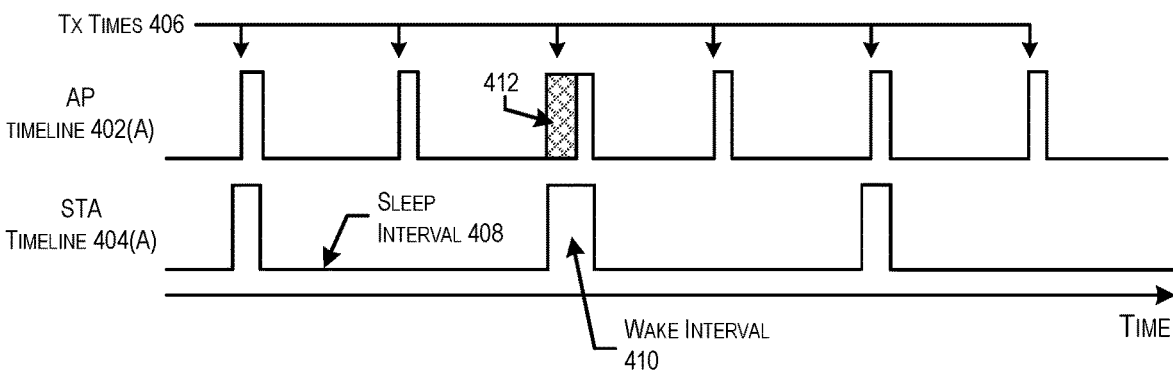
FIG. 4 depicts a conceptual view of potential issues that might arise in communications between an AP device and a STA device as a result of congestion in accordance with at least some embodiments.
Figure 4:
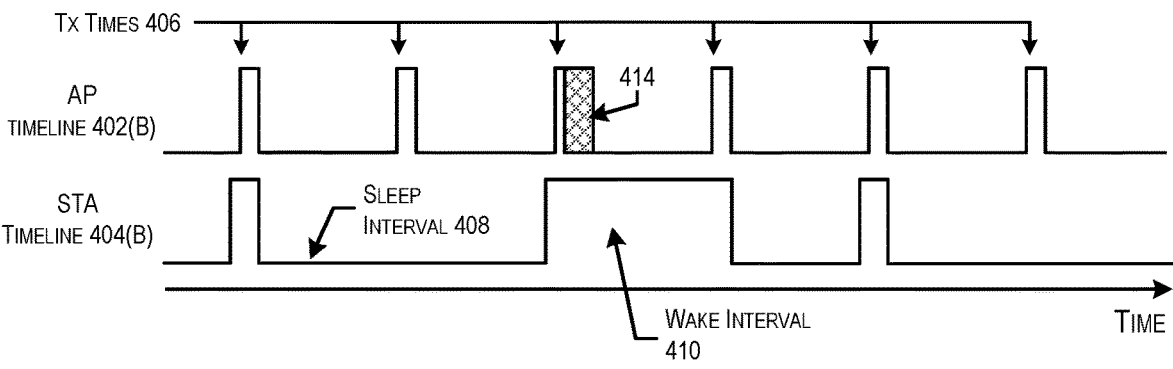

FIG. 4 depicts a conceptual view of potential issues that might arise in communications between an AP device and a STA device as a result of congestion in accordance with at least some embodiments. More particularly, FIG. 4 depicts an example of interactions between an AP device and a STA device as illustrated in two sets of timelines. A first set of timelines may include a timeline for an AP device (e.g., AP timeline 402(A)) and a timeline for a STA device (e.g., STA timeline 404(A)) during a first scenario.

As depicted, the AP device may be caused to transmit at a number of transmission times 406. Such transmission times may occur at predetermined intervals. Additionally, the STA device may be caused to execute a wake-up/sleep cycle in which a radio of the STA device is turned off during sleep intervals 408 and turned on during wake intervals 410. The sleep intervals 408 may persist for a predetermined amount of time, such that the wake-up intervals occur at predetermined intervals.

In embodiments, during one or more of the transmission times 406, the AP device may be busy (e.g., transmitting to a different STA device) for a collision interval 412. In the event that the interval 412 ends before the end of the scheduled transmission time 406, the STA device may extend the time for the wake interval 410 to allow the STA device to receive the transmission. As would be recognized, the extension of wake intervals in this manner would result in additional power usage that might drain the battery of the STA device.

A second set of timelines may include a timeline for the AP device (e.g., AP timeline 402(B)) and a timeline for the STA device (e.g., STA timeline 404(B)) during a second scenario.

In embodiments, during one or more of the transmission times 406, the AP device may be busy (e.g., transmitting to a different STA device) for a collision interval 414. In these embodiments, the STA device may extend the time for the wake interval 410 until the next scheduled transmission time 406, resulting in an increase to the amount of time that the radio of the STA device is turned on. As would be recognized, the extension of wake intervals in this manner would result in additional power usage that might drain the battery of the STA device.

Figure 5:
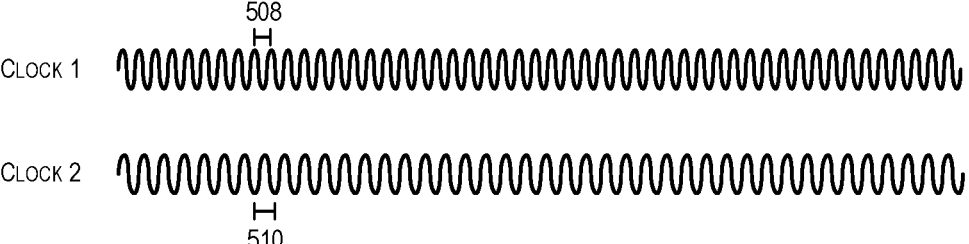
FIG. 5 depicts a conceptual view of potential issues that might arise in communications between an AP device and a STA device as a result of clock drift in accordance with at least some embodiments.
Figure 5:
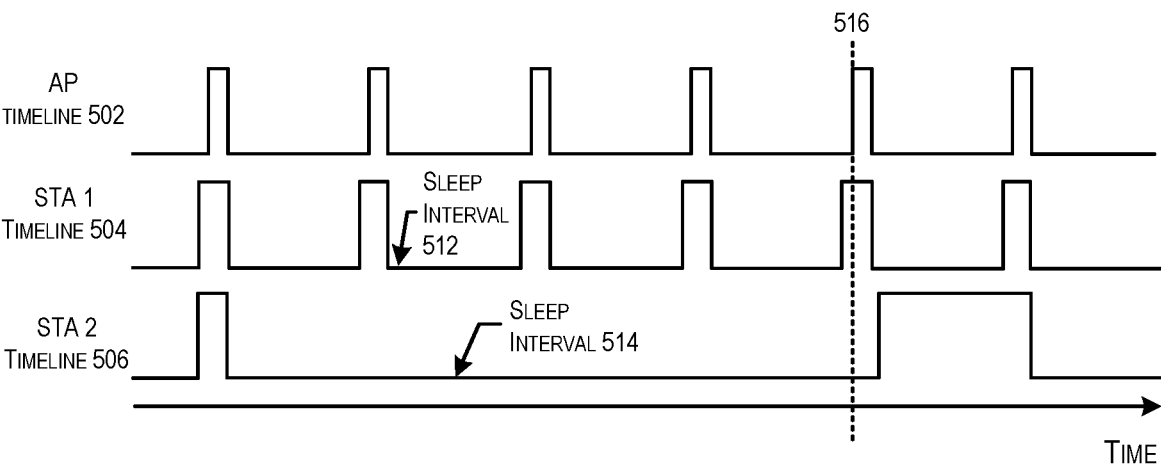

FIG. 5 depicts a conceptual view of potential issues that might arise in communications between an AP device and a STA device as a result of clock drift in accordance with at least some embodiments. More particularly, FIG. 5 depicts an example of interactions between an AP device and two different STA devices as illustrated in three timelines. Particularly, a timeline for an AP device (e.g., AP timeline 502) and a timeline for a first STA device (e.g., STA timeline 504) and a timeline for a second STA device (e.g., STA timeline 506) are depicted.

As noted elsewhere, timing operations performed on each of an AP device and/or a STA device may be enabled via oscillator hardware included in the respective device. For example, wake intervals and sleep intervals may both be scheduled based on timing operations managed via the oscillator hardware. However, each of these oscillators may have certain drift due to various factors such as aging, temperature variation, capacitor load imbalance, etc. Accordingly, the oscillation period of clocks in different devices may vary based on characteristics of those clocks. In this example, an oscillation period 508 of a clock 1 may be different from an oscillation period 510 of the clock 2.

Because of the difference in oscillation periods for different devices, timing may vary across those devices. In some embodiments, timing for the devices may be synchronized each time that a transmission is sent/received or upon occurrence of a synchronization event. Accordingly, devices may become more out of sync as the devices continue not to communicate. Longer sleep intervals may therefor result in devices becoming more out of synchronization, increasing the chance that a wake interval of the STA device will miss a transmission time of the AP device.

By way of example, a STA device 1 may have a sleep interval 512 that is relatively short compared to a sleep interval 514 of the STA device 2. Because of the relatively shorter length of the respective sleep intervals, the STA device 1 may be more in synchronization with the AP device than the STA device 2. As would be recognized, when the devices are sufficiently out of synchronization, a STA device may miss a transmission time 516 of the AP device, missing the transmission of data between the two devices. In embodiments, if a transmission time is missed (e.g., as shown at 516), a wake interval of the STA device 2 may be extended until the next transmission time, resulting in significantly increased power consumption. Accordingly, while it may be desirable to utilize a longer sleep interval in order to reduce overall battery power consumption, this may result in increasing clock drift, and may subsequently result in missed transmissions.

Figure 6:
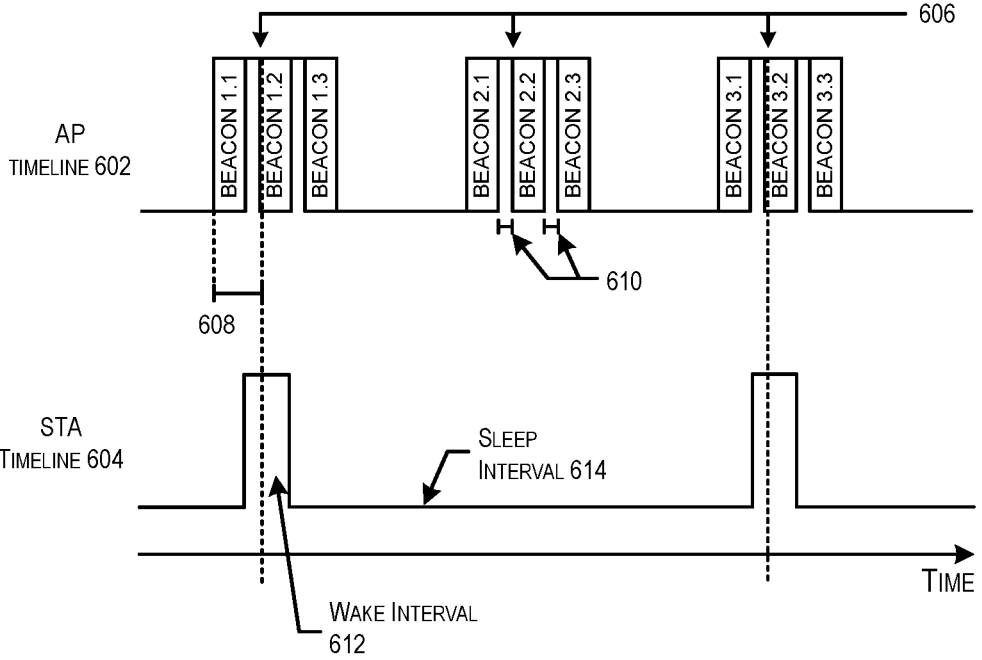
FIG. 6 depicts a conceptual view of communication techniques that may be implemented to use beacon bursting in accordance with embodiments.

FIG. 6 depicts a conceptual view of communication techniques that may be implemented to use beacon bursting in accordance with embodiments. More particularly, FIG. 6 depicts an example of interactions between an AP device and a STA device as illustrated in two timelines. Particularly, a timeline for an AP device (e.g., AP timeline 602) and a timeline for a STA device (e.g., STA timeline 604) are depicted.

In a WLAN system according to IEEE 802.11, a fundamental access mechanism of the medium access control (MAC) is a collision avoidance (CSMA/CA) mechanism. The CSMA/CA mechanism may also be called a distributed coordination function (DCF) of the IEEE 802.11 MAC and may utilize a listen-before-talk access mechanism. According to this type of access mechanism, an AP or a STA may perform a clear channel assessment (CCA) of a radio channel or medium during a predetermined time interval (e.g., a transmission time) before starting transmission. As a result of determining the radio channel to be idle, the AP or STA starts to transmit a frame through the radio channel.

When the radio channel is determined to be occupied or otherwise unavailable, the AP may configure a delay interval (e.g., a random backoff period) for radio channel access, wait for the delay interval, and then attempt to transmit a frame rather than starting transmission. As the random backoff period is applied, it would be expected that a plurality of STAs may attempt to transmit a frame after waiting for different (i.e., random) amounts of time, thereby minimizing a collision. More particularly, to minimize a collision, each of the STAs may select a random backoff count, may wait for a slot time corresponding to the count, and may then attempt transmission. When a random backoff process is started, a STA continues to monitor the radio channel while counting down backoff slots according to a determined backoff count value. While the monitored radio channel is in an occupied status, the STA suspends the countdown and waits. When the radio channel becomes idle, the STA resumes the remaining countdown.

For the purposes of the illustrated example, a beacon may consist of a beacon frame that is broadcast to STAs on the WLAN network. Each frame (e.g., beacon frame) may include a header (e.g., a MAC header), a body, and/or a trailer.

A frame header may include information about where the frame is going, the data rate, cipher suite used to encrypt data frames, network resources to be allocated to the transmission (e.g., a duration indication that can be used by a station to update a Network Allocation Vector (NAV)), or any other suitable information about the frame. In embodiments, other devices (e.g., other APs or STAs) may approximate how long the medium (e.g., radio channel) will be busy based on the duration value included in a MAC layer header. It should be noted that the contents of the header may vary for each different type of frame.

A frame body may include transmission information that is encapsulated and, in some cases, encrypted. The body of a frame varies in size depending on the amount/type of transmission information included. For example, voice traffic frames will generally be smaller than video traffic frames.

A frame trailer may include a frame check sequence (FCS). This is a 32-bit cyclic redundancy check (CRC) used to validate that the contents of the entire frame have not been tampered with or become corrupted while being transferred over the wireless medium. All values of the frame header and body are run through a calculation; the result is held in the FCS field. If the receiver runs the frame through the same calculation but the result is not the same, the frame is corrupt/damaged. The receiver will discard the frame and not send an ACK frame. The sender knows to retransmit the frame because it did not receive acknowledgement. This is typically a result of high interference/collisions.

In embodiments, a series of beacons may be implemented at periodic transmission times 606. In these embodiments, the beacons are transmitted in a series, such that the first beacon is scheduled to occur at some predetermined amount of time 608 before a scheduled transmission time 606. Multiple such beacons are transmitted back-to-back starting the predetermined amount of time 608 before the scheduled transmission time 606. For example, FIG. 6 depicts a series of three such beacons (beacons 1.1-3.3) transmitted in series.

In these embodiments, the first beacon includes information that can be used to reserve the radio channel for the other beacons. More particularly, a duration value in a MAC header of the first beacon can be used to protect the transmissions of the subsequent beacons. Upon transmission of the first beacon, the MAC header is detected by the other devices, which then determine the radio channel to be occupied and begin the backoff process. This leaves the radio channel free for the transmission that was intended for the beacons. More particularly, the radio channel can be made available during a wake interval 612 of the STA to which a transmission is to be directed, even when the first beacon is transmitted prior to the wake interval 612 (e.g., during a sleep interval 614).

The transmission of each of the beacons may be separated by a short time interval 610. The time interval 610 may correspond to a short interface spacing (SIFS) interval. In IEEE 802.11 networks, SIFS is the typical interframe spacing prior to transmission of an acknowledgment.

In embodiments, the length of time for a beacon and/or the amount of time 608 may be determined based on an amount of time needed to complete a transmission. For example, an AP device may track an amount of time typically taken to complete a transmission between the AP and a STA. In these embodiments, the length of each beacon, as well as the amount of time 608, may correspond to the time determined to be taken to complete the transmission.

An AP may be in communication with multiple STAs in a wireless network. The AP may identify a transmission time at which the transmission is to be initiated. In some cases, the transmission time may correspond to a time at which the STA is predicted to enter a wake interval.

Once such a transmission time has been identified, the AP may then determine an amount of time before the transmission time that the channel should be reserved. In some cases, such an amount of time may correspond to a typical amount of time that is taken to successfully contend for the channel, or a typical amount of time that is taken to complete a transmission. This amount of time may be learned by an AP over time as the AP transmits beacon frames, or transmits information to various STAs.

In other words, the AP may determine how long a typical contention process takes, or how long a typical transmission takes in order to ensure that the channel is reserved at least that much time before the transmission (e.g., transmission of a beacon frame) is to take place. In this way, the AP device can ensure that no new transactions start within a period that is the amount of time before the transmission time. Hence, the AP device ensures that most typical transmissions would be complete by the time that the actual transmission is to take place.

Figure 7:
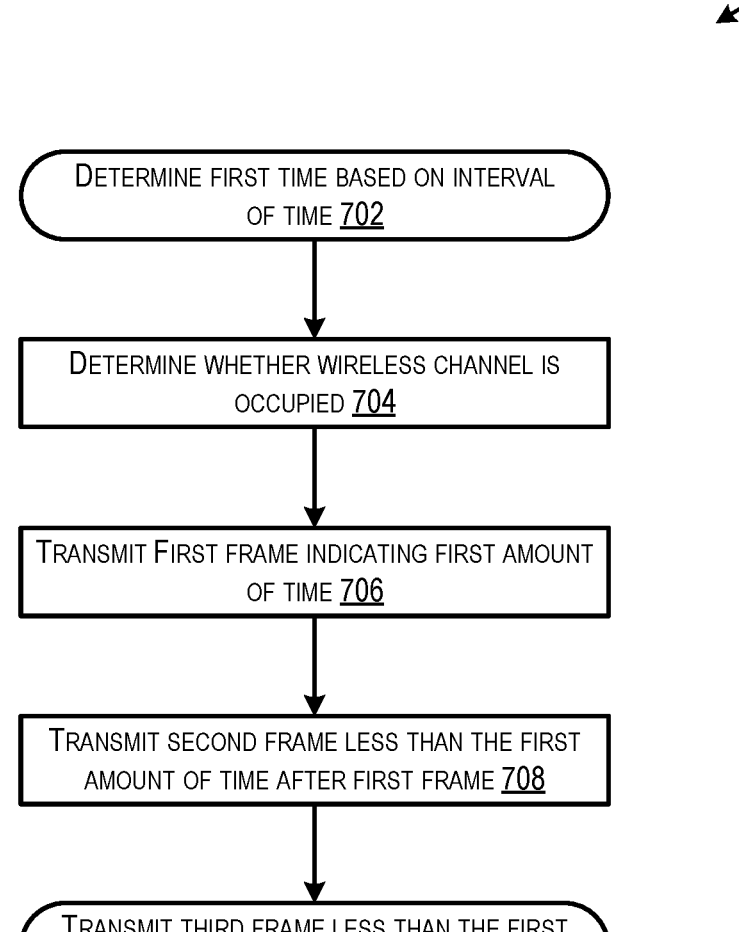
FIG. 7 depicts a flow diagram illustrating a process for reserving a channel using a series of beacon transmissions in accordance with at least some embodiments.

FIG. 7 depicts a flow diagram illustrating a process for reserving a channel using a series of beacon transmissions in accordance with at least some embodiments. While the process 700 is depicted as a series of blocks, it should be noted that the steps described in relation to process 700 may be performed in any suitable order. The process 700 may be performed between devices within a network, such as an access point (AP) device and one or more station (STA) device of the network. For example, the process 700 may be performed by the AP device 106 and/or STA device 102 as described in relation to FIG. 1 above. At 702, the process 700 may involve determining a first time associated with a potential communication with at least one STA. In some cases, the first time may correspond to a scheduled transmission time for an access point.

At 704, the process 700 may involve determining whether a wireless channel is currently occupied (or at least whether the channel will be occupied at the first time). In some cases, such a determination may be made based on detecting a frame transmitted over the wireless channel. In embodiments, a duration field included in the frame is used by devices receiving the frame to determine how long the transmission will occupy the channel.

Upon determining that the wireless channel is occupied, the process 700 may further involve determining a backoff time period. In this scenario, the process may further involve, after an amount of time has passed corresponding to the backoff time period, and upon determining that the wireless channel is not occupied, transmitting the first frame at a second time.

At 706, the process 700 may involve, based on determining that the wireless channel is not currently occupied (or at least will not be occupied at the first time), transmitting a first frame. In embodiments, the first frame indicates at least an amount of time for which the wireless channel is to be reserved, the amount of time being greater than an amount of time corresponding to the transmission of the first frame. In some cases, the first frame is a beacon frame. In other cases, the first frame is not a beacon frame.

The first frame may further include some combination of at least a length value in a signal field of a preamble of the first frame, a rate value in a signal field of a preamble of the first frame, or a duration value of a duration field of a MAC layer header in a payload. In embodiments, the length value indicates a length of time that is greater than a length of the first frame. Such a length value may be included in a signal field of a preamble of the first frame and may be expressed as a length in bytes. In some cases, the first length is determined based on a configured number of beacon frames to be transmitted in a burst. In some cases, the first frame is a beacon frame that includes first data representing a traffic indication map (TIM).

At 708, the process 700 may involve transmitting a second frame after transmitting the first frame and less than the amount of time after the transmitting of the first frame. In embodiments, the second frame is a beacon frame.

At 710, in some embodiments the process 700 may involve transmitting a third frame after transmitting the second frame and less than the amount of time after the transmitting of the first frame.

In some embodiments, the process may further involve, prior to the determining of the first time, transmitting over the wireless channel, a zeroth beacon frame that includes a beacon interval field indicating a beacon interval time value. In these embodiments, the process further involves determining a beacon time based on the beacon interval time value and determining the first time based on the beacon time, wherein the first time occurs prior to the beacon time.

In accordance with one or more preferred implementations, an AP determines a transmission time at which the transmission is intended to be initiated based on a predicted wake interval for the STA 1. The AP then determines a typical amount time taken to complete a transmission between the AP and one or more STAs. The AP then identifies a point in time that is the amount of time before the intended transmission time. The AP then begins transmitting the generated beacons in a series at the point in time. As noted elsewhere, the AP device may transmit the series of beacons with a space (e.g., SIFS) in between each of the beacons.

Each STA may employ a passive scanning method. In passive scanning, a STA performing the scanning waits for a beacon frame while moving between channels. A beacon frame is one of management frames in IEEE 802.11 and is periodically transmitted to indicate the presence of a wireless network and to enable the STA performing the scanning to find, and to participate in, the wireless network.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims.

What is claimed is:

1. A method comprising:
transmitting, by an access point over a wireless channel, a first beacon frame including a beacon interval field indicating a beacon interval time value;
determining, by the access point based on the beacon interval time value, a beacon time;
determining, by the access point based on the beacon time, a contending time that is prior to the beacon time;
determining, by the access point at the contending time, whether the wireless channel is occupied;
based on determining that the wireless channel is not occupied, transmitting a second beacon frame, the second beacon frame including first data indicating a first amount of time the wireless channel will be occupied, the first amount of time being greater than an amount of time corresponding to the transmitting of the first second frame;
after the transmitting of the second beacon frame, transmitting a third beacon frame, the transmitting of the third beacon frame occurring less than the first amount of time after the transmitting of the second beacon frame.

2. The method of claim 1, wherein the first data comprises a first value of a duration field of a media access control (MAC) layer header in a payload of the first frame.

3. The method of claim 1, wherein the method comprises determining the first amount of time based on a configured number of beacon frames to transmit in a burst.

4. An electronic device comprising:
a wireless transceiver;

one or more processors;
one or more non-transitory computer readable media storing computer executable instructions which, when executed using the one or more processors, cause the electronic device to perform operations comprising
determining, based on a beacon interval time value, a first time;
determining, at the first time, whether a wireless channel is occupied;
based on determining that the wireless channel is not occupied, transmitting a first frame, the first frame including first data indicating a first amount of time the wireless channel will be occupied, the first amount of time being greater than an amount of time corresponding to the transmitting of the first frame;
after the transmitting of the first frame, transmitting a second frame, the second frame being a beacon frame, and the transmitting of the second frame occurring less than the first amount of time after the transmitting of the first frame.

5. The electronic device of claim 4, wherein the first frame is a beacon frame.

6. The electronic device of claim 4, wherein the first frame is not a beacon frame.

7. The electronic device of claim 4, wherein the first frame is a beacon frame and comprises first data representing a traffic indication map (TIM).

8. The electronic device of claim 4, wherein the first data comprises a first value of a duration field of a media access control (MAC) layer header in a payload of the first frame.

9. The electronic device of claim 4, wherein the one or more computer readable media store computer executable instructions which, when executed using the one or more processors, cause the electronic device to perform operations comprising
prior to the determining of the first time, transmitting, over the wireless channel, a zeroth beacon frame including a beacon interval field indicating the beacon interval time value;
determining, based on the beacon interval time value, a beacon time; and
determining, based on the beacon time, the first time;
wherein the first time is prior to the beacon time.

10. The electronic device of claim 4, wherein the one or more computer readable media store computer executable instructions which, when executed using the one or more processors, cause the electronic device to perform operations comprising
after transmitting of the second frame, transmitting a third frame, the third frame being a beacon frame, and the transmitting of the third frame occurring less than the first amount of time after the transmitting of the first frame.

11. The electronic device of claim 4, wherein the one or more computer readable media store computer executable instructions which, when executed using the one or more processors, cause the electronic device to perform operations comprising
based on determining at the first time that the wireless channel is occupied, determining a backoff time period;
based on a determination that an amount of time has passed corresponding to the backoff time period, determining at a second time that the wireless channel is not occupied;
wherein the transmitting of the first frame is based on the determining at the second time that the wireless channel is not occupied.

12. The electronic device of claim 4, wherein the first frame includes second data comprising a length value in a signal field of a preamble of the first frame; and a rate value in a signal field of a preamble of the first frame;

wherein the length value indicates a length that is greater than a length of the first frame.

13. The electronic device of claim 4, wherein the one or more computer readable media store computer executable instructions which, when executed using the one or more processors, cause the electronic device to perform operations comprising determining the first amount of time based on a configured number of beacon frames to transmit in a burst.

14. The electronic device of claim 4, wherein the first time is determined based on a delay parameter, and wherein the one or more computer readable media store computer executable instructions which, when executed using the one or more processors, cause the electronic device to perform operations comprising based on determining at the first time that the wireless channel is occupied, determining a backoff time period;

based on a determination that an amount of time has passed corresponding to the backoff time period, determining at a second time that the wireless channel is not occupied;

based on the determining at the first time that the wireless channel is occupied and the determining at the second time that the wireless channel is not occupied, determining a difference between the first time and the second time, and updating the delay parameter based on the difference;

wherein the transmitting of the first frame is based on the determining at the second time that the wireless channel is not occupied.

15. The electronic device of claim 4, wherein the one or more computer readable media store computer executable instructions which, when executed using the one or more processors, cause the electronic device to perform operations comprising based on determining at a second time that the wireless channel is occupied, determining a backoff time period;

based on a determination that an amount of time has passed corresponding to the backoff time period, determining at a third time that the wireless channel is not occupied;

based on the determining at the second time that the wireless channel is occupied and the determining at the third time that the wireless channel is not occupied, determining a difference between the second time and the third time, and determining a value of a delay parameter based on the difference;

wherein the first time is determined based on the delay value.

16. The electronic device of claim 4, wherein the one or more computer readable media store computer executable instructions which, when executed using the one or more processors, cause the electronic device to perform operations comprising determining a number of beacon frames to transmit based on a maximum transmit opportunity time;

determining the first amount of time based on a configured number of beacon frames to transmit in a burst.

17. A method comprising:

determining, by an access point based on a beacon interval time value, a first time;

determining, by the access point at the first time, whether a wireless channel is occupied;

based on determining that the wireless channel is not occupied, transmitting a first frame, the first frame including first data indicating a first amount of time the wireless channel will be occupied, the first amount of time being greater than an amount of time corresponding to the transmitting of the first frame;

after transmitting of the first frame, transmitting a second frame, the second frame being a beacon frame, and the transmitting of the second frame occurring less than the first amount of time after the transmitting of the first frame.

18. The method of claim 17, wherein the method comprises:

after transmitting of the second frame, transmitting a third frame, the third frame being a beacon frame, and the transmitting of the third frame occurring less than the first amount of time after the transmitting of the first frame.

19. The method of claim 17, wherein the method comprises:

based on determining at the first time that the wireless channel is occupied, determining a backoff time period;

based on a determination that an amount of time has passed corresponding to the backoff time period, determining at a second time that the wireless channel is not occupied;

wherein the transmitting of the first frame is based on the determining at the second time that the wireless channel is not occupied.

20. The method of claim 17, wherein the first frame is not a beacon frame.

21. The method of claim 17, wherein the first frame includes second data comprising a length value in a signal field of a preamble of the first frame; and a rate value in a signal field of a preamble of the first frame;

wherein the length value indicates a length that is greater than a length of the first frame.

22. The method of claim 17, wherein the first data comprises a first value of a duration field of a media access control (MAC) layer header in a payload of the first frame.

23. The method of claim 17, wherein the first frame is a beacon frame.

24. The method of claim 17, wherein the method comprises:

prior to the determining of the first time, transmitting, by the access point over the wireless channel, a zeroth beacon frame including a beacon interval field indicating a beacon interval time value;

determining, based on the beacon interval time value, a beacon time; and determining, based on the beacon time, the first time;

wherein the first time is prior to the beacon time.

25. An electronic device comprising:

a wireless transceiver;

one or more processors;

one or more non-transitory computer readable media storing computer executable instructions which, when executed using the one or more processors, cause the electronic device to perform operations comprising determining, based on a beacon interval time value, a first time;

determining, at the first time, whether a wireless channel is occupied;

based on determining that the wireless channel is not occupied, transmitting a first frame, the first frame including first data indicating a first length;

after the transmitting of the first frame, transmitting a second frame, the second frame being a beacon frame;

wherein the first length is at least as great as a length of the first frame and a length of the second frame.

26. The electronic device of claim 25, wherein the first length is indicated in a signal field of a preamble of the first frame.

27. The electronic device of claim 25, wherein the first frame comprises first data in a duration field of a media access control (MAC) layer header in a payload of the first frame, the first data indicating a first duration value corresponding to the first length.

28. The electronic device of claim 25, wherein the one or more computer readable media store computer executable instructions which, when executed using the one or more processors, cause the electronic device to perform operations comprising determining the first length based on a configured number of beacon frames to transmit in a burst.

29. The electronic device of claim 25, wherein the first length is a length in bytes.

\* \* \* \* \*